No. 105,398. PATENTED JULY 12, 1870.
W. A. WICKS.
MACHINE FOR SEAMING SHEET METAL CANS.
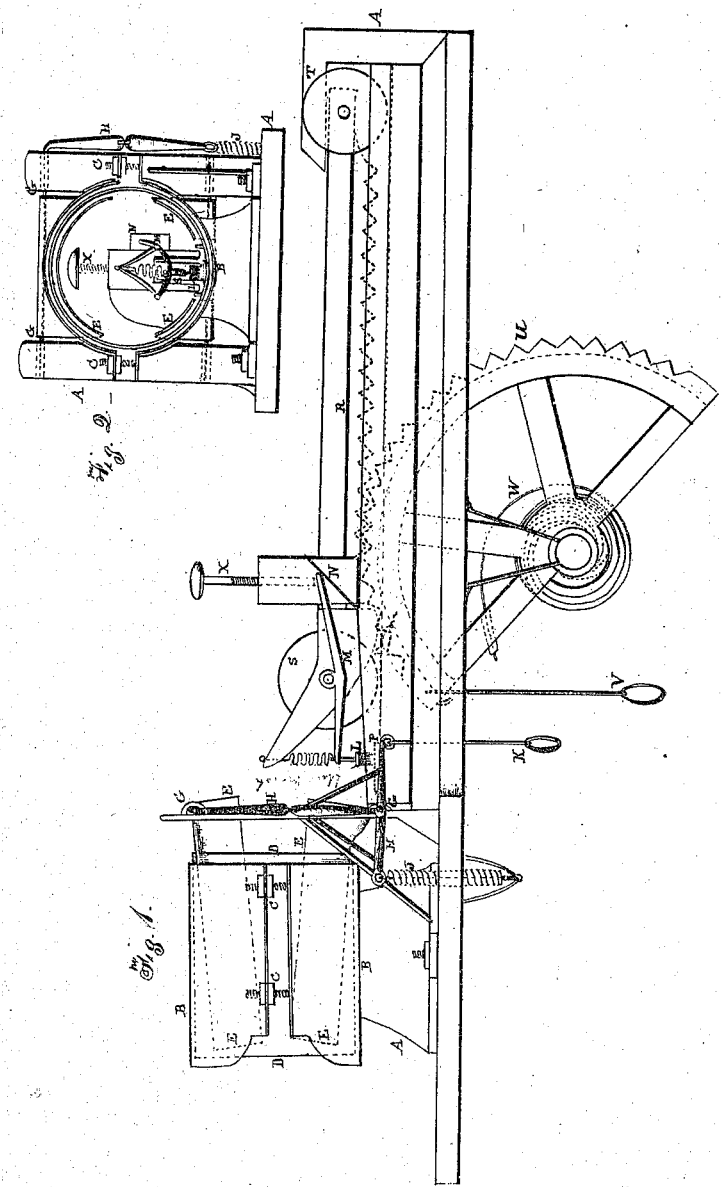

United States Patent Office.

WILLIAM A. WICKS, OF BALTIMORE, MARYLAND.

Letters Patent No. 105,398, dated July 12, 1870.

IMPROVEMENT IN MACHINE FOR SEAMING SHEET-METAL CANS.

The Schedule referred to in these Letters Patent and making part of the same

To all whom it may concern:

Be it known that I, WILLIAM A. WICKS, of the city of Baltimore, county of Baltimore and State of Maryland, have invented an "Improved Machine for Making the Seams of Sheet-metal Cans;" and I do hereby declare the following to be an exact description thereof, reference being had to the accompanying drawing and to the letters of reference marked thereon making a part of this specification, in which—

Figure 1 represents a side elevation of the machine.

Figure 2 exhibits a view of the front of the cylinder, with the tin can on the inside, and also represents the spring jaws or fastener that hold the can on the inside of the cylinder, while the seam of the can is being soldered; also shows the position of the soldering-brush as it and the roller move to the front along the seam of the can.

To enable others skilled in the art to make and use my invention, I will proceed to describe its construction and operation.

The nature of my invention consists in the mode of making the seam or upright joints of metal cans on the inside instead of the outside, by means of a spring, longitudinal jaws, or fastener operating on the inside of the cylinder, that holds the body of the can closely and firmly against the inside of the cylinder, while the seam is being soldered by a traveling brush and roller, moving back and forward by means of a treadle, double rack, and regulating coiled spring underneath, the brush being self-feeding, and carrying the proper soldering-flux, and depositing the flux along the whole length of the seam, while the roller, following in its rear, flattens down and smoothes out any inequalities in the edges of the tin to be joined. A common hot soldering-iron is then used, and moved along the soldering-flux and seam, to tighten it; the object of my invention being to gauge and size the bodies of metal cans on the outside of the body, instead of the inside, and making the seam on the inside instead of the outside, so that the outside of the seam or upright joints of the cans may be perfectly even, regular, and smooth, producing a perfectly uniform size of can, that the bottoms and tops of cans, usually made to bind upon the outside rims of the bodies, will be fitted better and firmer to the rims. Whether the tin or metal be thick or thin, the outside diameter will always be the same, without any regard to the inequalities, irregularities, or diameter of the inside, the outside uniformity of the size of the can being always of more importance.

Thus, by my invention, I make a stronger seam, with less amount of solder, and always produce a perfectly uniform fit for top and bottom.

Another advantage gained by my invention is that the gauging, sizing, and soldering are accomplished expeditiously and accurately.

A represents the frame that supports the devices.

B, an iron cylinder, with regulating screws C C at the sides, to increase or diminish the diameter of the cylinder.

On the inside of this cylinder B the tin D or metal for the body of an oyster or fruit-can is placed, and gauged or sized by the dimensions of the cylinder B, the edges or seam of the can D being, at the lower side, one edge lapping over the other slightly, so as to be soldered on the inside. The body of the can is thus formed on the inside of the cylinder, instead of on the outside of the cylinder, as heretofore, and the seam or jointed ends of the can are soldered on the inside, instead of on the outside, as heretofore.

A longitudinal holder, E, operating on a spring hinge, G, in the rear, extends through the cylinder B, and against the inside of the body of the can, holding the can tightly against the cylinder while the seam is being soldered, and opening or closing, to receive the can or remove it, by means of the lever H, spring J, and treadle K.

L is an upright spring brush, regulated by a pivoted lever, M, on the side, the rear end of the lever falling upon an incline plane, N, at the side, to dip the brush into the slot P or receptacle to contain the soldering-flux, and then allow the brush to rise up and carry the solder along the seam as it is moved forward by the traveling rack R.

The roller S, in the rear of the brush, and in front of the traveling rack R, serves to flatten the seam before it is soldered.

The roller may be grooved or flanged on its periphery, so as to countersink the seam on each side as it passes over the seam, that the double thickness of the tin, as joined, may be on the inside, while the outside of the can is intended to be made perfectly smooth, free from any ridge caused by the seam.

The traveling rack R extends along the top of the frame, in a side guide, and moves on two rollers, T T, at the rear end of the rack.

A semicircular toothed wheel, U, gears into the teeth of the horizontal traveling rack R, moving it forward by means of the treadle V, and drawing it back again by the coiled spring W, attached to the axle and side of the half-wheel U.

The front end of the traveling rack R is raised or lowered by means of the regulating screw X, at top, so as to regulate the required height of the soldering-brush L and roller S.

What I claim as my invention, and desire to secure by Letters Patent, is—

1. The jaws E, soldering-brush L, and roller S, when arranged, constructed, and operating as herein described, and for the purposes set forth.

2. The spring jaws E, side lever H, and treadle K, combined and operating as herein described.

3. The combination of the brush L, roller S, rack R, pivoted lever M, with spring semicircular toothed wheel U, when constructed, arranged, and operating as herein described and for the purposes set forth.

WM. A. WICKS.

Witnesses:
J. FRANKLIN REIGART,
EDM. F. BROWN.